(12) United States Patent
Choi et al.

(10) Patent No.: US 11,851,623 B2
(45) Date of Patent: Dec. 26, 2023

(54) BIOCRUDE OIL MANUFACTURING SYSTEM USING PLASTIC MIXED BIOMASS AND MANUFACTURING METHOD USING THE SYSTEM

(71) Applicant: KOREA INSTITUTE OF MACHINERY & MATERIALS, Daejeon (KR)

(72) Inventors: Yeon-Seok Choi, Daejeon (KR); Sangkyu Choi, Daejeon (KR); Soyoung Han, Daejeon (KR); Yeon Woo Jeong, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 17/290,440

(22) PCT Filed: Jun. 7, 2019

(86) PCT No.: PCT/KR2019/006901
§ 371 (c)(1),
(2) Date: Apr. 30, 2021

(87) PCT Pub. No.: WO2020/204259
PCT Pub. Date: Oct. 8, 2020

(65) Prior Publication Data
US 2022/0010221 A1    Jan. 13, 2022

(30) Foreign Application Priority Data
Apr. 5, 2019  (KR) .................. 10-2019-0040447

(51) Int. Cl.
| | |
|---|---|
| *C10G 1/00* | (2006.01) |
| *C10B 53/02* | (2006.01) |
| *C10B 53/07* | (2006.01) |
| *C10G 9/00* | (2006.01) |
| *C10B 49/22* | (2006.01) |
| *C10G 1/02* | (2006.01) |
| *C10G 1/10* | (2006.01) |

(52) U.S. Cl.
CPC .............. *C10G 9/002* (2013.01); *C10B 49/22* (2013.01); *C10B 53/02* (2013.01); *C10B 53/07* (2013.01); *C10G 1/02* (2013.01); *C10G 1/10* (2013.01); *C10G 2300/1003* (2013.01); *C10G 2300/1014* (2013.01); *C10G 2300/1096* (2013.01); *C10G 2300/80* (2013.01)

(58) Field of Classification Search
CPC ............ C10G 1/00; C10B 53/02; C10B 53/07
See application file for complete search history.

(56) References Cited

U.S. PATENT DOCUMENTS 10,723,965 B1 *  7/2020  Lu ........................... C10L 5/447

FOREIGN PATENT DOCUMENTS

| JP | 2007-302732 | 11/2007 |
|---|---|---|
| KR | 10-2003-0066811 | 8/2003 |
| KR | 10-2013-0127148 | 11/2013 |
| KR | 10-2015-0045995 | 4/2015 |
| KR | 10-2016-0019914 | 2/2016 |

OTHER PUBLICATIONS

E. Zanella et al., Low-Temperature Co-Pyrolysis of Polyropylene and Coffee Wastes to Fuels, 27 ENERGY & FUELS 1357-1364 (2013).*
Y. S. Choi et al., Fast Pyrolysis of Coffee Ground in a Tilted-Slide Reactor and Characteristics of Biocrude Oil, Environmental Process & Sustainable Energy (2017).*
Q. V. Nguyen et al., Improvement of Bio-Crude Oil Properties via Co-Pyrolysis of Pine Sawdust and Waste Polystyrene Foam, 237 J. Environmental Management 24-29 (2019).*

* cited by examiner

*Primary Examiner* — Randy Boyer
(74) *Attorney, Agent, or Firm* — LEX IP MEISTER, PLLC

(57) ABSTRACT

A technique for manufacturing biocrude oil with an improved heating value and viscosity is disclosed in the present specification. A biocrude oil manufacturing system according to one embodiment includes: a pyrolysis gas generator for generating a pyrolysis gas through a fast pyrolysis reaction from a supplied mixture material; and a biocrude oil generator for generating biocrude oil by condensing the pyrolysis gas generated by the pyrolysis gas generator, wherein the mixture material includes a mixture of biomass and plastics, and the biocrude oil manufacturing system further includes an alcohol supply for supplying an alcohol to the pyrolysis gas generator and/or the biocrude oil generator.

8 Claims, 4 Drawing Sheets

BIOCRUDE OIL MANUFACTURING SYSTEM USING PLASTIC MIXED BIOMASS AND MANUFACTURING METHOD USING THE SYSTEM

TECHNICAL FIELD

The present invention relates to a biocrude oil manufacturing system. More particularly, the present invention relates to a biocrude oil manufacturing system that can improve quality of biocrude oil, and a biocrude oil manufacturing method using the same.

BACKGROUND ART

In general, biomass includes woody, herbaceous, cultivated plants, organic sludge, animal manure, and food waste, and methods for producing biocrude oil using biomass have been widely researched. In addition, since biocrude oil is manufactured using various types of materials, a process of introducing materials into the manufacturing process is important, and it is important to study a method of manufacturing biocrude oil using a new type of waste whenever a new type of waste is discovered.

In general, biocrude oil refers to a liquid fuel similar to heavy oil produced by methods such as fast pyrolysis in an oxygen-free atmosphere near about 500° C. or high temperature high pressure hydrolysis of biomass such as sawdust and coffee grounds. This biocrude oil has a drawback of which a heating value is 50% lower than that of petroleum oil due to a large amount of oxygen contained in the raw material biomass.

Accordingly, there is a need for research on the properties of raw materials to improve the heating value of biocrude oil and a method for lowering the viscosity of the produced crude oil.

DISCLOSURE

Technical Problem

One aspect disclosed in the present specification is to provide an improved biocrude oil manufacturing system and a biocrude oil manufacturing method using the same. Another aspect of the present specification is to provide a mixture material formed to be used in generation of biocrude oil by being provided to the biocrude oil manufacturing system.

The technical object to be achieved by the biocrude oil manufacturing system according to the technical idea of the technology disclosed in this specification is not limited to the task for solving the above-mentioned problem, and another task that is not mentioned is to a person skilled in the art can be clearly understood from the following description.

Technical Solution

A biocrude oil manufacturing system according to an embodiment of the present disclosure includes: a pyrolysis gas generator configured to generate a pyrolysis gas through a fast pyrolysis reaction from a supplied mixture material; and a biocrude oil generator configured to generate a biocrude oil by condensing the pyrolysis gas generated from the pyrolysis gas generator, wherein the mixture material includes a mixture of biomass and plastic, and the biocrude oil manufacturing system includes an alcohol supply that supplies alcohol to at least one of the pyrolysis gas generator and the biocrude oil generator.

The biomass may include coffee biomass

The plastic may contain polystyrene, or a mixture of polystyrene and polyethylene.

The polystyrene may be formed of a wt % in excess of 25% based on the total weight of the mixture material.

The alcohol may be methanol or ethanol or a mixture thereof.

The pyrolysis gas generator may include: a mixture material supply formed to supply the mixture material; a fluid sand supply that supplies high-temperature fluid sand to heat the mixture material; and a fast pyrolysis reactor that is formed to generate a pyrolysis gas through pyrolysis of the supplied mixture material by the supplied high-temperature fluid sand.

The pyrolysis gas generator may further include a heater that provides heat required for fast pyrolysis of the mixture material to the fast pyrolysis reactor.

The biocrude oil generator may include a condenser formed to generate biocrude oil by receiving and condensing pyrolysis gas generated from the fast pyrolysis reactor.

A biocrude oil manufacturing method according to an embodiment of the disclosed technology of the present specification includes: pyrolysis gas generating to generate a pyrolysis gas through a fast pyrolysis reaction from the supplied mixture material; and biocrude oil generating to generate biocrude oil by condensing the pyrolysis gas generated from the pyrolysis gas generating, wherein the mixture material may include a mixture of biomass and plastic, and the biocrude oil manufacturing method may include alcohol supplying to supply alcohol in at least one of the pyrolysis gas generating and the biocrude oil generating.

The biomass may include coffee biomass.

The plastic may contain polystyrene, or a mixture of polystyrene and polyethylene.

The polystyrene may be formed of a wt % in excess of 25% based on the total weight of the mixture material.

The alcohol may be methanol or ethanol or mixture thereof.

The pyrolysis gas generating may include: supplying the mixture material to supply the mixture material; supplying fluid sand to supply high-temperature fluid sand to heat the mixture material; and fast pyrolysis reaction for generation of a pyrolysis gas through pyrolysis by pyrolysis of the supplied mixture material by the supplied high temperature fluid sand.

The pyrolysis gas generating may include heating to provide heat required for fast pyrolysis of the mixture material in the fast pyrolysis reaction.

The biocrude oil generating may include condensing to generate a biocrude oil by receiving and condensing pyrolysis gas generated from the fast pyrolysis reaction.

A mixture material according to an embodiment of the disclosed technology of the present specification is used to generate biocrude oil by being provided in a biocrude oil manufacturing system, and is formed by including coffee biomass and plastic, wherein the plastic includes polystyrene.

The polystyrene may be formed of more than 25% by weight of the total weight of the mixture material.

Advantageous Effects

According to the biocrude oil manufacturing system and the biocrude oil manufacturing method using the biocrude oil manufacturing system according to an embodiment of the technology disclosed in this specification, it is possible to improve the heating value of the biocrude oil, and there is a merit in which the viscosity is improved. In addition, according to an embodiment of the present invention, there is the effect of suppressing the aging phenomenon in which the viscosity of biocrude oil increases with time.

However, the effects that can be achieved by the biocrude oil manufacturing system and the biocrude oil manufacturing method using the biocrude oil manufacturing system according to an embodiment of the technology disclosed in this specification are not limited to those mentioned above, and other effects not mentioned will be able to be clearly understood by a person skilled in the art from the disclosure described below.

MODE FOR INVENTION

Figure 1:
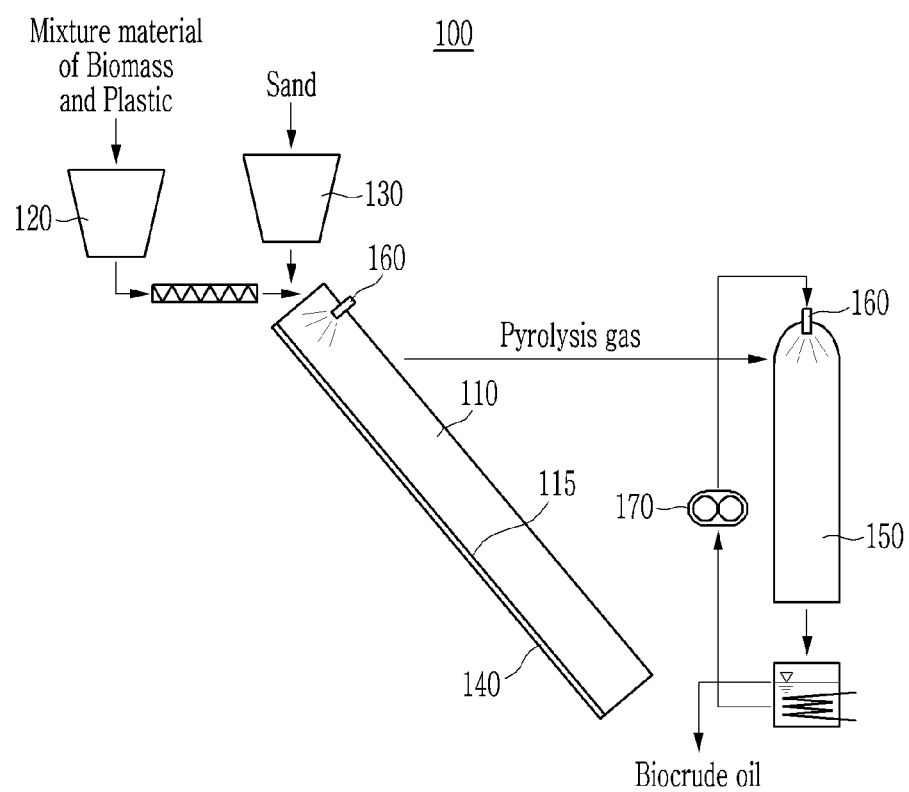
FIG. 1 illustrates an embodiment of a biocrude oil manufacturing system.

Hereinafter, the present invention will be described with reference to the accompanying drawing. However, the present invention may be implemented in various different forms, and therefore is not limited to the embodiments described herein. Accordingly, the drawings and description are to be regarded as illustrative in nature and not restrictive. Like reference numerals designate like elements throughout the specification.

In the entire specification, when a portion is "connected (connected, contacted, combined)" with another portion, it is not only "directly connected", but also includes the case where it is "indirectly connected" with another member in the middle". In addition, unless explicitly described to the contrary, the word "comprise", and variations such as "comprises" or "comprising", will be understood to imply the inclusion of stated elements but not the exclusion of any other elements.

The terms used in this specification are only used to describe a specific embodiment, and are not intended to limit the present invention. Expressions in the singular include a plurality of expressions, unless the context clearly indicates otherwise. In this specification, terms such as "include" or "have" are intended to designate the existence of features, numbers, steps, actions, constituent elements, parts, or combinations of these described in the specification, but it should be understood that the possibility of one or more other features, the presence or addition of elements, numbers, steps, actions, constituent elements, parts or combinations thereof is not preliminarily excluded.

In addition, expressions such as "a first", "a second", "the first", or "the second" used in various embodiments can modify various configurations elements regardless of their order and/or importance, and do not limit the corresponding constituent elements.

For example, without departing from the range of the technology disclosed in this specification, a first constituent element may be named a second constituent element, and similarly, a second constituent element may be named a first constituent element.

A biocrude oil manufacturing system according to the present embodiment is a system that manufactures biocrude oil from a mixture material of biomass and plastics by using fast pyrolysis technology.

Mixture Material

The biomass applied to the biocrude oil manufacturing system and a manufacturing method according to the present embodiment may include woody, herbaceous, cultivated plants, organic sludge, animal manure, and food waste, but preferably coffee biomass may be used.

In the present embodiment, plastic may include polypropylene, polyethylene, polystyrene, acrylonitrile-butadiene-styrene (ABS), and a copolymer thereof, or may be a mixed plastic including at least two of the plastics, and preferably, polystyrene or a mixed plastic of polystyrene and polyethylene can be used. More preferably, the polystyrene may be used as a mixed material formed of more than 25% by weight of the total weight of the mixture material.

The mixture material is formed to be used in generation of biocrude oil by being provided to the biocrude oil manufacturing system according to the present embodiment, wherein the biocrude oil manufacturing system undergoes pyrolysis gas generating and biocrude oil generating, and alcohol supplying that supplies alcohol in at least one of the pyrolysis gas generating and the biocrude oil generating is further included.

Biocrude Oil Manufacturing System

FIG. 1 illustrates an embodiment of a biocrude oil manufacturing system. As shown in FIG. 1, a biocrude oil manufacturing system according to an embodiment includes a pyrolysis gas generator and a biocrude oil generator.

The pyrolysis gas generator is formed to generate a pyrolysis gas through a fast pyrolysis reaction from a supplied mixture material.

The pyrolysis gas generator includes a mixture material supply 120 that supplies the above-described mixture material to a reactor, a fluid sand supply 130 that supplies a high-temperature fluid sand to heat the mixture material, and a fast pyrolysis reactor 110 that is formed to generate a gas through pyrolysis of the supplied mixture material by the supplied high temperature fluid sand.

In addition, the fast pyrolysis reactor 110 may be provided with a heater 140 that provides additional heat required for fast pyrolysis of the supplied mixture material.

Referring to FIG. 1, specifically, the biomass and plastic mixture material supply 120 is a device that supplies a mixture material formed of biomass and plastic to a heating slope 115 of the fast pyrolysis reactor 110. The biomass supply 120 may be provided in a first inlet that is formed in one side of an upper portion of the fast pyrolysis reactor 110.

An inlet of the mixture material of biomass and plastic may be formed in the upper portion of the biomass and plastic mixture material supply 120 such that the mixture material can be injected therethrough, and an outlet of the mixture material of biomass and plastic may be formed in a lower portion of the biomass and plastic mixture material supply 120 such that the mixture material can be selectively discharged into the fast pyrolysis reactor 110. The mixture material outlet may be connected to be communicated with the first inlet of the fast pyrolysis reactor 110. In addition, the outlet of the mixture material of biomass and plastic may be formed to be capable of adjusting whether or not to discharge the mixture material and a discharge amount of the mixture material.

The fluid sand supply unit 130 is a device that supplies high temperature fluid sand to the heating slope 115 of the fast pyrolysis reactor 110. The fluid sand supply 130 may be provided at a second inlet formed on the other side of the upper portion of the fast pyrolysis reactor 110. Here, the high temperature fluid sand is a heat transfer medium that is mixed with a mixture material of biomass and plastic to accelerate the fast pyrolysis process of the mixture material. As the fluid sand, a material of small particles that does not melt during fast pyrolysis can be used. For example, sand or steel balls may be used as the fluid sand, but in the present embodiment, it will be described that sand is used as an example of the fluid sand.

A fluid sand inlet through which the fluid sand is injected can be formed in an upper portion of the fluid sand supply 130, and a fluid sand output through which the fluid sand can be selectively discharged into the fast pyrolysis reactor may be formed in a lower portion of the fluid sand supply 130. The fluid sand output may be connected in communication with the second inlet of the fast pyrolysis reactor. In addition, fluid sand output may be formed to be capable of adjusting whether or not to discharge the fluid sand and a discharge amount of the fluid sand.

The fast pyrolysis reactor 110 is a device where a fast pyrolysis reaction of a mixture material of biomass and plastic is carried out such that a pyrolysis gas is generated for biocrude oil production. The fast pyrolysis reactor 110 may be formed to have a hollow space inside to pass through the mixture material of biomass and plastic and the fluid sand during fast pyrolysis. Such a fast pyrolysis reactor 110 can be formed as a cross-section of at least one shape among circular, elliptical, or polygonal, but in the present embodiment, for better comprehension and ease of description, the fast pyrolysis reactor 110 is described as being formed in a quadrangular cross-section.

The fast pyrolysis reactor 110 may be provided with the heating slope 115 in at least one of four side surfaces. The mixture material of biomass and plastic and the fluid sand can slide from the top to the bottom of the fast pyrolysis reactor 110 along the surface of the heating slope 115. Hereinafter, as shown in FIG. 1, in the present embodiment, it will be described that the fast pyrolysis reactor 110 is disposed obliquely in the vertical direction, and the side portion of the fast pyrolysis reactor 110 that is relatively disposed to the lower side forms the heating slope 115. However, it is not limited thereto, and it is obvious to a person of ordinary skill in the art that the heating slope 115 may be variously formed according to the design conditions and circumstances of the fast pyrolysis reactor.

Meanwhile, a first inlet and a second inlet through which the mixture material of biomass and plastic and the fluid sand are introduced can be formed in the upper portion of the fast pyrolysis reactor 110, and an alcohol supply 160 that sprays alcohol can be formed in the upper portion of the fast pyrolysis reactor 110. When the mixture material of biomass and plastic and the fluid sand are introduced into the fast pyrolysis reactor 110, the alcohol supply 160 may spray alcohol to mix the alcohol with the supplied mixture material.

The heater 140 is a device that provides heat required for fast pyrolysis of the mixture material of biomass and plastic to the fast pyrolysis reactor 110. The heater 140 may be provided in the lower portion of the heating slope 115 to heat the heating slope 115 of the fast pyrolysis reactor 110. Thus, the mixture material of biomass and plastic can experience fast pyrolysis by the heat of heater 140 transferred through the heating slope 115 and by the heat transferred from the high temperature fluid sand.

The heater 140 can be provided with a heat source directly, but it can also receive necessary heat from an external heat source. Hereinafter, in the present embodiment, it will be described that a heat source of the heater 140 is directly mounted on the bottom side of the heating slope 115 together with the heater 140. The heat source of the heater 140 can be formed by combustion devices such as burners or electric heaters. For example, referring to FIG. 1, the heater 140 may be an electric heating plate attached to the bottom surface of the heating slope 115. Hereinafter, in the present embodiment, it will be described that the heat source of the heater 140 has a combustion mechanism or electric heating means, but is not limited thereto. For example, the heater 140 may be formed in a structure in which hot air generated from an external combustion furnace is provided to the heating slope 115.

A pyrolysis gas generated from the pyrolysis gas generator of the fast pyrolysis reactor 110 is transferred to the biocrude oil generator. The biocrude oil generator includes a condenser 150, and the condenser 150 is formed to receive and condense the pyrolysis gas generated from the fast pyrolysis reactor 110 of the pyrolysis gas generator, thereby generating biocrude oil.

Referring to FIG. 1, the condenser 150 is a device that condenses fast pyrolysis gas into biocrude oil. An inlet of the condenser 150 may be connected to the fast pyrolysis reactor 110, and an alcohol supply 160 through which alcohol is injected may be formed. In the present embodiment, it is described that a single condenser is provided, but the present invention is not limited thereto, and a plurality of condensers may be provided in multiple stages depending on the design condition and situation of the biocrude oil manufacturing system.

When the fast pyrolysis gas generated from the fast pyrolysis reactor 110 is transmitted to the condenser 150, the alcohol supply 160 provided in the condenser 150 may spray alcohol to mix the alcohol with the fast pyrolysis gas. The condenser 150 may generate biocrude oil by condensing the fast pyrolysis gas or a mixture of the fast pyrolysis gas and alcohol. Meanwhile, as shown in FIG. 1, the biocrude oil mixed with alcohol may be circulated by a circulation pump 170, and thus the alcohol can be continuously supplied into the condenser 150.

As previously described, the biocrude oil manufacturing system according to the embodiment has one of the features of including the alcohol supply 160 to supply alcohol by spraying alcohol. The alcohol supply 160 may be provided in at least one of the inside of the fast pyrolysis reactor and the inside of the condenser to supply alcohol to at least one of the fast pyrolysis reactor 110 and the condenser 150. Therefore, alcohol can be sprayed into the mixture material of biomass and plastic supplied inside the fast pyrolysis reactor 110, or alcohol can be sprayed into the fast pyrolysis gas transmitted to the condenser 150 after the fast pyrolysis reaction, to thereby improve viscosity due to wax formation.

The alcohol according to the present embodiment may include a linear or branched alcohol having 1 to 5 carbon atoms, preferably methanol or ethanol or a mixture thereof.

Biocrude Oil Manufacturing Method

Figure 2:
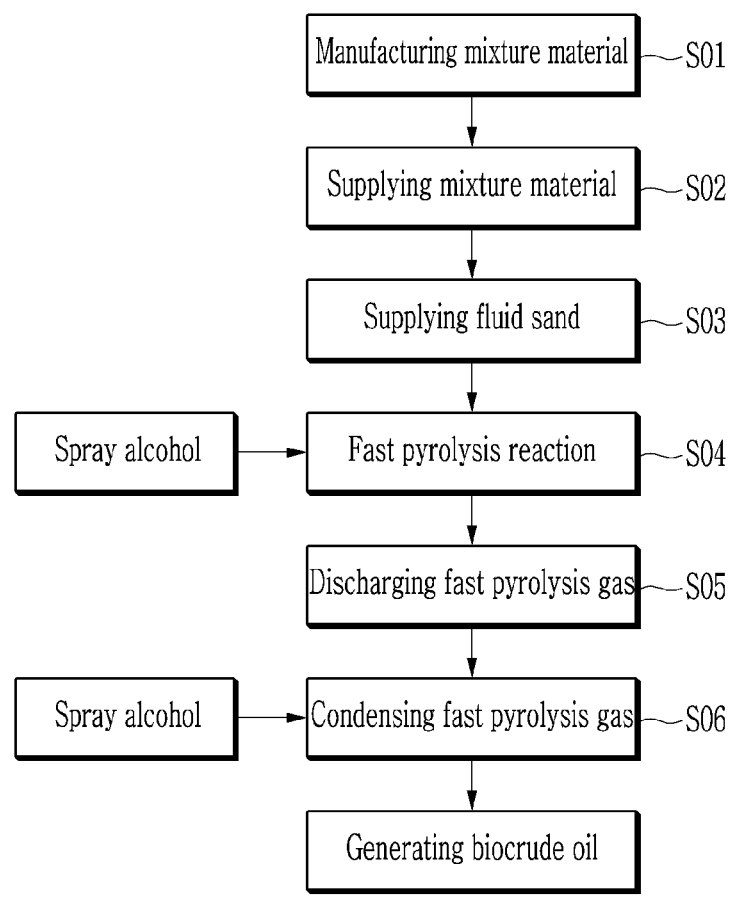
FIG. 2 illustrates a flowchart of biocrude oil manufacturing method according to an embodiment of the disclosed technology of the present specification.

A biocrude oil manufacturing method according to an embodiment is schematically illustrated in FIG. 2.

A biocrude oil manufacturing method according to an embodiment roughly includes: pyrolysis gas generating to generate pyrolysis gas through a fast pyrolysis reaction from the supplied mixture material; and biocrude oil generating to generate biocrude oil by condensing the pyrolysis gas generated from the pyrolysis gas generating. In particular, alcohol supplying is included to spray alcohol in at least one of the pyrolysis gas generating and the biocrude oil generating.

First, the pyrolysis gas generating includes: manufacturing a mixture material by mixing biomass and plastic (S01); mixture material supplying to supply the mixture material (S02); fluid sand supplying to supply high-temperature fluid sand to heat the mixture material (S03); fast pyrolysis reacting to generate a gas through pyrolysis of the supplied mixture material by the supplied high temperature fluid sand (S04); and discharging the generated pyrolysis gas (S05).

In the manufacturing the mixture material (S01), the mixture material is provided with at least a mixture of coffee biomass and plastic, and the plastic is provided as polystyrene or a mixture of polystyrene and polyethylene, while the polystyrene is manufactured with a wt % in excess of 25% based on the total weight of the mixture material.

In the supplying of the mixture material (S02), the mixture material is supplied into a fast pyrolysis reactor through biomass and plastic mixture material supply.

In the supplying of the fluid sand (S03), fluid sand is supplied into the fast pyrolysis reactor through a fluid sand supply.

Through the fast pyrolysis reaction (S04), the supplied mixture material and the high-temperature fluid sand contact each other such that fast pyrolysis is carried out in the fast pyrolysis reactor, thereby generating a pyrolysis gas. Meanwhile, heating may be further included in the fast pyrolysis reaction (S04) to provide heat required for fast pyrolysis of the mixture material.

After the discharging the fast pyrolysis gas generated in the fast pyrolysis to the outside of the reactor through a gas outlet (S05), the fast pyrolysis gas is transmitted to a condenser and thus undergoes condensation (S06) through which the fast pyrolysis gas is liquefied into biocrude oil.

In particular, the fast pyrolysis or the condensation in the pyrolysis gas generating includes spraying methanol or ethanol or a mixture thereof.

Hereinafter, the present invention will be described in detail with reference to embodiments for better understanding. However, the following embodiments are merely illustrative of the contents of the present invention, and the scope of the present invention is not limited to the following embodiments. Embodiments of the present invention are provided to more completely describe the present invention to a person with average knowledge in the art.

Viscosity Comparison of Biocrude Oil

Embodiment 1

1. Prepare Feedstock

The coffee grounds obtained from Starbucks Korea Co., Ltd. contained 50% to 60% of moisture, and were dried using a rotation hot air dryer and thus the moisture was less than 10%. Coffee grounds are collected in a powder form, and thus no separate grinding process is required. Polyethylene and polypropylene were provided in the form of a film and pulverized to a size of 5 mm or less. Since polystyrene is provided in the form of a polystyrene foam having a very low density, it was treated by heating to the form of an ingot to increase the density and was pulverized to particles of less than 5 mm in size in order to facilitate sample injection. The pretreated coffee grounds, polystyrene, and polyethylene were mixed at a ratio of 60:25:15%, respectively.

2. Fast Pyrolysis Process

The reaction was carried out in a fast pyrolysis reactor in a biocrude oil manufacturing system. The pyrolysis reaction temperature was 550° C., and the mixed sample was added at 20 kg per hour to perform fast pyrolysis for 1 hour.

When fast pyrolysis gas was transmitted to the condenser in the biocrude oil manufacturing system, condensable components were condensed to produce biocrude oil.

Embodiment 2

It was carried out in the same manner as in Embodiment 1, except that coffee grounds, polystyrene, and polyethylene were mixed at a ratio of 60:30:10%, respectively.

Embodiment 3

It was carried out in the same manner as in Embodiment 1, except that coffee grounds, polystyrene, and polyethylene were mixed at a ratio of 60:35:5%, respectively.

Embodiment 4

It was carried out in the same manner as in Embodiment 1, except that coffee grounds and polystyrene were mixed at a ratio of 60:40%, respectively.

Comparative Example 1

It was carried out in the same manner as in Embodiment 1, except that coffee grounds, polystyrene, and polyethylene were mixed at a ratio of 60:20:20%, respectively.

Comparative Example 2

It was carried out in the same manner as in Embodiment 1, except that polystyrene was not included, and coffee grounds and polypropylene were mixed at a ratio of 60:40%, respectively.

Table 1 shows the viscosities of biocrude oils according to Embodiments 1 to 4, Comparative Example 1, and Comparative Example 2 measured at 82° C.

TABLE 1

| | Feedstock | Viscosity (cP) @ 82° C. |
|---|---|---|
| Embodiment 1 | Coffee ground 60% + PS 25% + PE 15% | 2594 |
| Embodiment 2 | Coffee ground 60% + PS 30% + PE 10% | 15.1 |
| Embodiment 3 | Coffee ground 60% + PS 35% + PE 5% | 6.81 |
| Embodiment 4 | Coffee ground 60% + PS 40% | 5.37 |
| Comparative Example 1 | Coffee ground 60% + PS 20% + PE 20% | 3094 |
| Comparative Example 2 | Coffee ground 60% + PP 40% | Not moving at 100° C. |

As shown in Table 1, it can be seen that when polystyrene is mixed in the feedstock at at least 25% of the entire weight, it has a remarkable viscosity improvement effect compared to the case where it is not, and particularly when it is more than 30%, this effect is more significant.

Comparison of Heating Value of Biocrude Oil

The calorific value of biocrude oil was measured using a bomb calorimeter (LECO AC-350) to measure higher heating values of coffee grounds biocrude oil and sawdust biocrude oil. As shown in Table 2, the heating value of biocrude oil by coffee biomass was 7157 kcal/kg, and the heating value of biocrude oil by sawdust biomass was measured to be 4465 kcal/kg. This shows that the use of coffee biomass can have a larger heating value compared to other biomasses of wood.

TABLE 2

| Sample | Heating value (kcal/kg) |
| --- | --- |
| Coffee grounds | 7157 kcal/kg |
| Sawdust | 4465 kcal/kg |

Comparison of Viscosity According to Ethanol Addition Ratio

The coffee grounds biomass was prepared in the same condition as in Embodiment 1. After the fast pyrolysis reaction in the biocrude oil manufacturing system, ethanol was added to the biocrude oil at different ratios. Viscosity was measured using a viscometer (Brookfield, Model DV-II Pro) at 50° C.

Figure 3:
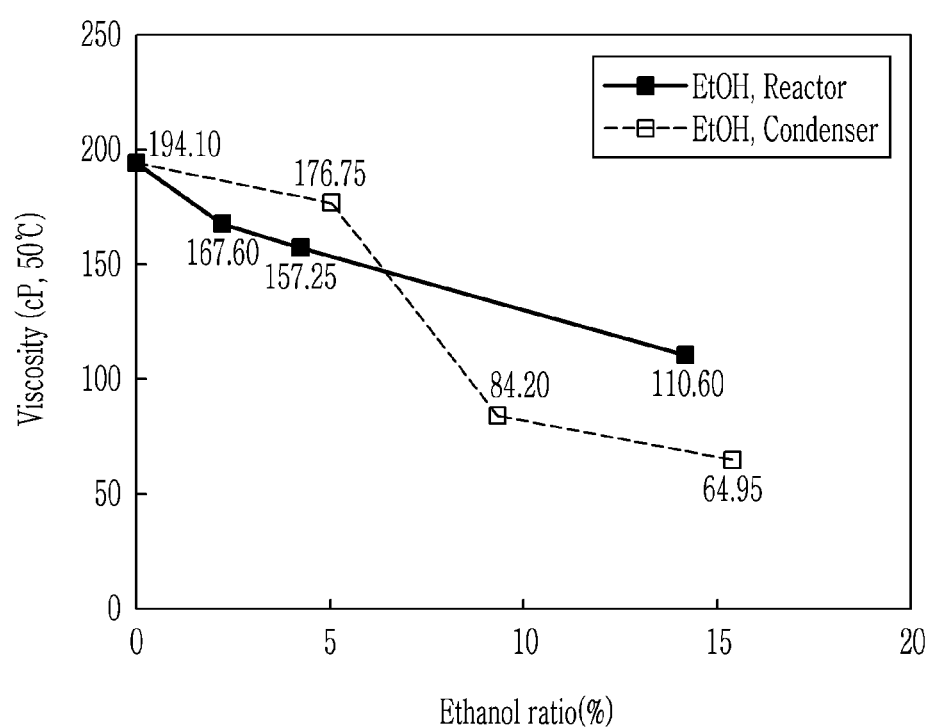
FIG. 3 is a graph that shows a viscosity comparison for the ratio of ethanol addition to coffee biomass in the biocrude oil manufacturing method disclosed in this specification.

As shown in FIG. 3, it was found that the viscosity improved as ethanol was added to the biocrude oil. FIG. 3 is a graph that shows a viscosity comparison for the ratio of ethanol addition to coffee biomass in the biocrude oil manufacturing method disclosed in this specification. The addition ratio is the weight of ethanol added to the weight of the biocrude oil produced. Referring to FIG. 3, it can be seen that the viscosity was improved in every case when ethanol was injected to the fast pyrolysis reactor or the condenser.

Viscosity Comparison According to Methanol Addition Ratio

The coffee grounds biomass was prepared in the same condition as in Embodiment 1. After fast pyrolysis reaction in the biocrude oil manufacturing system, methanol was added to biocrude oil at different ratios. Viscosity was measured using a viscometer (Brookfield, Model DV-II Pro) at 50° C.

Figure 4:
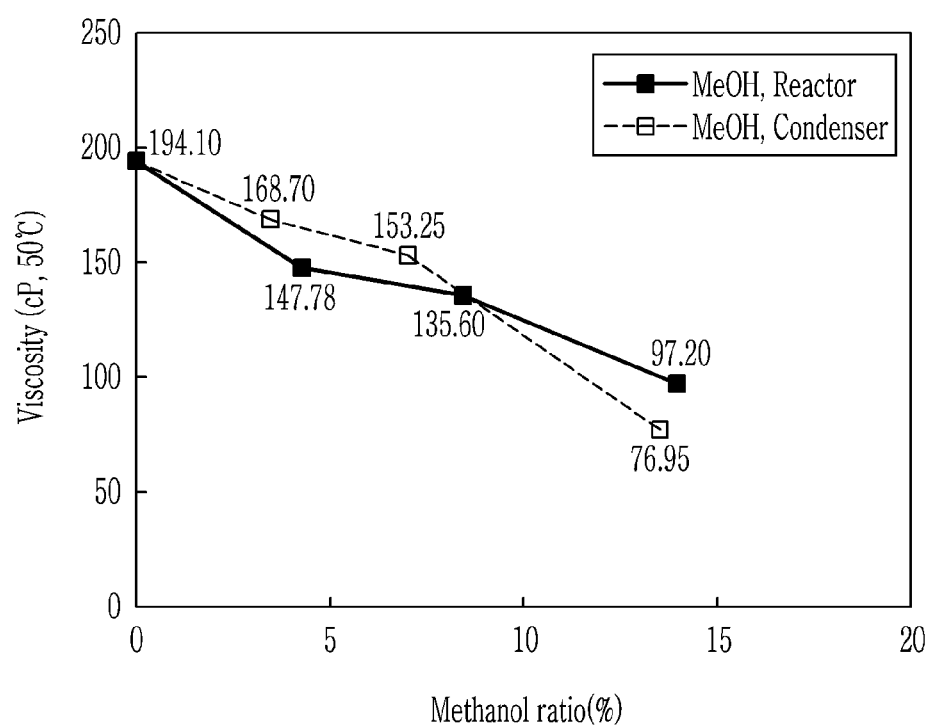
FIG. 4 is a graph that shows a viscosity comparison for the ratio of methanol addition to coffee biomass in the biocrude oil manufacturing method disclosed in this specification.

As shown in FIG. 4, it was found that the viscosity improved as methanol was added to biocrude oil. FIG. 4 is a graph that shows a viscosity comparison for the ratio of methanol addition to coffee biomass in the biocrude oil manufacturing method disclosed in this specification. The addition ratio is the weight of methanol added to the weight of the biocrude oil produced. Referring to FIG. 4, it can be seen that the viscosity was improved in every case when methanol was injected to the fast pyrolysis reactor or the condenser.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

The invention claimed is:

1. A biocrude oil manufacturing method comprising:
   pyrolysis gas generating to generate a pyrolysis gas through a fast pyrolysis reaction from a supplied mixture material; and
   biocrude oil generating to generate biocrude oil by condensing the pyrolysis gas generated from the pyrolysis gas generating
   wherein the mixture material includes a mixture of biomass and plastic, and
   the biocrude oil manufacturing method comprises alcohol supplying that supplies alcohol to at least one of the pyrolysis gas generating and the biocrude oil generating.

2. The biocrude oil manufacturing method of claim 1, wherein
   the biomass includes coffee biomass.

3. The biocrude oil manufacturing method of claim 2, wherein
   the plastic contains polystyrene, or a mixture of polystyrene and polyethylene.

4. The biocrude oil manufacturing method of claim 3, wherein
   the polystyrene is formed of a wt % in excess of 25% based on the total weight of the mixture material.

5. The biocrude oil manufacturing method of claim 1, wherein
   the alcohol is methanol or ethanol or a mixture thereof.

6. The biocrude oil manufacturing method of claim 1, wherein
   the pyrolysis gas generating comprises:
   supplying the mixture material to supply the mixture material;
   supplying fluid sand to supply high-temperature fluid sand to heat the mixture material; and
   fast pyrolysis reaction to generate a pyrolysis gas through pyrolysis of the supplied mixture material by the supplied high temperature fluid sand.

7. The biocrude oil manufacturing method of claim 6, wherein
   the pyrolysis gas generating comprises heating to provide heat required for fast pyrolysis of the mixture material to the fast pyrolysis reaction.

8. The biocrude oil manufacturing method of claim 6, wherein
   the biocrude oil generating includes condensing to generate biocrude oil by receiving and condensing pyrolysis gas generated from the fast pyrolysis reaction.

* * * * *